(12) United States Patent
Dempsey et al.

(10) Patent No.: US 7,390,520 B2
(45) Date of Patent: Jun. 24, 2008

(54) PROCESS FOR PREPARING A CHEWABLE PET FOOD

(75) Inventors: Paul Murrow Dempsey, Dalkey (IE); John Walsh, Charleville (IE)

(73) Assignee: Gaines Pet Treats Limited (IE)

( * ) Notice: Subject to any disclaimer, the term of this patent is extended or adjusted under 35 U.S.C. 154(b) by 562 days.

(21) Appl. No.: 10/999,524

(22) Filed: Nov. 30, 2004

(65) Prior Publication Data
US 2005/0220970 A1   Oct. 6, 2005

(30) Foreign Application Priority Data

| Apr. 4, 2004 | (IE) | ................... 2004/0390 |
| Apr. 6, 2004 | (EP) | ................... 04394032 |

(51) Int. Cl.
*A23P 1/12* (2006.01)

(52) U.S. Cl. .................. 426/516; 426/512; 426/615; 426/805

(58) Field of Classification Search ................. 426/615, 426/516, 512, 805
See application file for complete search history.

(56) References Cited

U.S. PATENT DOCUMENTS

| 4,681,758 A | 7/1987 | Fruthaler et al. |
| 5,102,671 A | 4/1992 | Coles |
| 5,397,834 A | 3/1995 | Jane et al. |
| 5,523,293 A | 6/1996 | Jane et al. |
| 5,965,708 A | 10/1999 | Bassi et al. |
| 6,455,083 B1 | 9/2002 | Wang |
| 2002/0172752 A1 | 11/2002 | Chizmas |
| 2006/0105025 A1* | 5/2006 | Hill et al. ..................... 424/442 |

FOREIGN PATENT DOCUMENTS

| GB | 2280348 | 2/1995 |
| GB | 2332850 | 7/1999 |
| WO | WO 95/01730 | 1/1995 |
| WO | WO 00/13521 | 3/2000 |
| WO | WO 01/45517 | 6/2001 |

* cited by examiner

*Primary Examiner*—Helen F Pratt
(74) *Attorney, Agent, or Firm*—Lanier Ford Shaver & Payne P.C.; George P. Kobler

(57) ABSTRACT

A process for preparing an extrudable product suitable for forming into a chewable pet food and comprising between about 56% to about 80% dry wheat gluten mix, between about 9% to about 28% liquid plasticizer mix and between about 8% to about 18% moisture by weight of the product is disclosed. The process comprises mixing the dry wheat gluten mix with water in an extruder, to form a moist wheat gluten mix, and mixing the moist wheat gluten mix with a liquid plasticizer mix and extruding at a temperature of less than 70° C. to form the extrudable product. The invention also relates to the extrudable product and to the chewable pet food formed therefrom by means of either further extrusion or injection moulding.

105 Claims, 2 Drawing Sheets

PROCESS FOR PREPARING A CHEWABLE PET FOOD

CROSS REFERENCE TO RELATED APPLICATIONS

Priority is claimed to co-owned pending Irish Patents Office Application No. IE 2004/0309, and co-owned European Patent Office Application EP04394032.9, both filed Apr. 6, 2004.

BACKGROUND

1. Field of the Invention

The present invention relates to a process for preparing an extrudable product, suitable for forming into a chewable pet food and comprising between about 56% to about 80% dry wheat gluten mix, between about 9% to about 28% liquid plasticizer mix and between about 8% to about 18% moisture by weight of the product. The invention further relates to the extrudable product prepared by that process. The invention also relates to a process for preparing a chewable pet food from the extrudable product and additionally relates to the chewable pet food.

2. Related Art

It is well known to produce products from wheat gluten and plasticizers. Wheat gluten is used in certain products as it imparts elasticity to the product. However, there are difficulties in processing wheat gluten and in particular controlling the processing flowability. U.S. Pat. No. 5,665,152 discloses a method of forming a biodegradable article from a formulation comprising, among other components, a grain protein such as wheat gluten, starch, a plasticizer and a reducing agent. The formulation is pelleted by extrusion processing at temperatures of less than 80° C. to avoid protein denaturation. A reducing agent is added to improve the flowability during processing. The disadvantage of adding a reducing agent is that most reducing agents are not compatible with animal feed regulations, and therefore the resultant products would be unsuitable for use as an animal chew.

PCT Publication No. WO 00/13521 discloses a protein-based thermoplastic composition comprising, among other components, a protein such as soy protein or wheat gluten and an edible plasticizer. The composition can be formed into a chewable pet toy or artificial dog bone by injection molding, pressure molding, transfer molding or extrusion molding. In this case water is added to improve the processing flowability. During processing the water content of the composition is increased to 35% by weight of the composition. Some of this water is removed downstream of the process by drying the pellets. The disadvantage however of adding water to improve the processing flowability is that this water must be removed downstream, necessitating the requirement of a drying step to remove the excess water which is both expensive and time consuming. Additionally, the high percentage of water added has a disadvantageous effect on the resultant product in that as water evaporates from the product during storage the surfaces of the product crack.

In the process disclosed in PCT Publication No. WO 00/13521, the ingredients are all blended and mixed together at the same time. This is disadvantageous in that the moisture uptake of the protein and thus the overall moisture content is difficult to control thus resulting in the need for an additional amount of water to be added than what is actually required to provide the minimum moisture content necessary to hydrate the protein. Additionally, extrusion molding is carried out at temperatures of between about 95° C. and about 110° C. The disadvantage of using temperatures in this region is that protein denaturation occurs. As the protein denatures, its molecular structure and thus properties change. This results in a product of reduced nutritional value. Furthermore, as the protein in the wheat gluten denatures the wheat gluten adopts a chewing gum like consistency, becomes sticky and is extremely difficult to handle during processing. Additionally during denaturation of the protein the composition containing the protein hardens and forms a shape in the extruder. Further shaping of the composition downstream is therefore difficult.

Thus, there is a need for a process for preparing a product containing wheat gluten suitable for forming into a chewable pet food and a chewable pet food which overcomes the above-mentioned disadvantages.

SUMMARY OF INVENTION

The present disclosure is directed to a process that satisfies this need.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

According to the invention, there is provided a process for preparing an extrudable product suitable for forming into a chewable pet food the product comprising between about 56% to about 80% dry wheat gluten mix, between about 9% to about 28% liquid plasticizer mix and between about 8% to about 18% moisture by weight of the product, characterised in that;

the process comprises;

feeding the dry wheat gluten mix into an extruder having an inlet temperature of between about 25° C. and about 45° C. and an exit temperature of between about 50° C. and about 70° C. and mixing the dry wheat gluten mix with water in the extruder to form a moist wheat gluten mix;

heating the liquid plasticizer mix to a temperature of between about 40° C. and about 70° C.;

feeding the liquid plasticizer mix into the extruder and mixing with the moist wheat gluten mix in the extruder to form a gluten plasticizer composition; and extruding the gluten plasticizer composition to form the extrudable product.

The advantage of mixing the dry wheat gluten mix with water prior to addition of the liquid plasticizer mix is that this allows for better control of the moisture content of the extrudable product and resultant pet food. By mixing the water with the dry wheat gluten mix first the desired amount of water can be absorbed by the wheat gluten before addition of the liquid plasticizer mix and none of this water is lost by interacting with the plasticizer. Thus it is sufficient to add the minimum amount of water necessary to hydrate the wheat gluten mix. Additionally as the wheat gluten mix is moist before it is mixed with the liquid plasticizer mix, a better interaction between the wheat gluten mix and the liquid plasticizer mix occurs. The resultant wheat gluten plasticizer composition is more uniform in consistency, free from lumps and has improved flowability.

Furthermore as it is possible to use less water than heretofore in order to hydrate the dry wheat gluten mix this is advantageous in that it is not necessary to dry the product at any stage to remove excess water which results in both a time and cost saving.

Preferably the extruder has an inlet temperature of about 35° C. and an exit temperature of about 60° C. The advantage of maintaining the extruder temperature below 70° C. is to avoid heat denaturation of the protein and in particular the protein content of the wheat gluten, thus avoiding the wheat gluten denaturing and sticking to the inside of the extruder. This is advantageous in that it improves handling and processing of the wheat gluten. Furthermore, as the protein in the wheat gluten has not denatured, it is easy to shape the extrudable product containing the wheat gluten into a desired shape downstream.

Additionally, by maintaining the temperature below this level, the resultant composition has a moisture content of between about 8% to about 18% by weight of the composition. At this moisture level, the resultant pet food has a flexible elastic chewy consistency.

Ideally the extruder is run at between about 60% and about 70% of the operating speed of the extruder. The advantage of running the extruder at this speed, is that due to the low shear rates which result, the temperature does not increase above the desired level in the extruder. Furthermore as less water is required it is possible to run the extruder at this speed. Generally, this will result in an extruder speed of around 370 rpm but will vary depending upon the size of the extruder.

Preferably the dry wheat gluten mix comprises at least 70% wheat gluten by weight of the mix. The advantage of using wheat gluten as a protein source is that as well as being a nutritious ingredient it also has elastic properties and therefore the resultant pet food is chewy. Furthermore, as it is a byproduct of many industries such as the milling, brewing and distilling industries, it is a plentiful commodity.

Further preferably the dry wheat gluten mix further comprises a fibre selected from the group consisting of one or more of cellulose fibre, wheat fibre and wheat bran of between about 0.1 and about 18.0% by weight of the mix. The advantage of adding fibre is that it adds structure to the pet food and has a beneficial role in promoting regularity of the digestive system of the animal. Any source of fibre is suitable.

Ideally the dry wheat gluten mix further comprises chicken digest of between about 0.1 and about 10.8% by weight of the mix. The advantage of adding chicken digest is to improve the organoleptic properties of the pellet and thus improve the palatability of the resultant pet food.

Preferably the dry wheat gluten mix further comprises monoglycerides of edible fatty acids of between about 0.1 and about 1.8% by weight of the mix. The advantage of adding monoglycerides of edible fatty acids is that they act as emulsifiers and improve the interaction between the liquid plasticizer mix and water, and between the dry wheat gluten mix and water.

Further, preferably the dry wheat gluten mix comprises a phosphate selected from the group consisting of one or more of sodium tripolyphosphate, calcium tripolyphosphate, calcium hydrogen phosphate and tetrasodium pyrophosphate of between about 0.1 and about 1.8% by weight of the mix. The advantage of adding a phosphate is that it promotes healthy teeth by acting as a chelate and helping to remove plaque from the teeth of the animal. It also aids in the conversion of the starch fraction of the wheat gluten, and improves the functionality of the starch fraction.

Ideally the dry wheat gluten mix further comprises a stearate selected from the group consisting of one or more of calcium stearate and magnesium stearate of between about 0.1 and about 1.8% by weight of the mix. The advantage of adding a stearate is that it acts as an extrusion aid and prevents sticking of the mix to the extruder. Stearates can also be dusted onto the pellets after extrusion. The advantage of this is that sticking of the pellets to each other during storing or handling is prevented. Furthermore, dusting can also prevent the pellets sticking to each other in the initial part of the molding process.

Preferably the dry wheat gluten mix further comprises potassium chloride of between about 0.1 and about 0.18% by weight of the mix. The advantage of adding potassium chloride is that it acts as a catalyst, in the conversion of the starch fraction of the wheat gluten by a phosphate such as sodium tripolyphosphate.

Ideally the liquid plasticizer mix comprises at least 95% plasticizer by weight of the liquid plasticizer mix and the plasticizer is selected from the group consisting of one or more of glycerine, propylene glycol, diglycerol, triethylene glycol, urea, sorbitol mannitol, maltitol hydrogenated corn syrup, polyvinyl alcohol, polyethylene glycol, $C_{12}$-$C_{22}$ fatty acids and metal salts of such fatty acids. The advantage of adding a plasticizer such as glycerine is that it improves the processing flowability, acts as a humectant and enhances the flexibility of the resulting pet food.

Preferably the liquid plasticizer mix further comprises a hygiene additive selected from the group consisting of one or more of peppermint oil and parsley oil of between about 0.01% and about 0.5% by weight of the mix. The advantage of adding hygiene additives such as peppermint oil and parsley oil is that they promote fresh breath.

Further preferably the liquid plasticizer mix further comprises coloring of between about 0.01% and about 0.5% by weight of the mix. The advantage of adding colorings is largely for aesthetic purposes. However, preferably chlorophyll is used which has an added benefit in that it occurs naturally in the cells of plant leaves and is not harmful to the animal. Additionally chlorophyll also plays a role in promoting fresh breath of the animal.

In one embodiment of the invention the gluten plasticizer composition is extruded to form pellets. Preferably each pellet is substantially cylindrical, and has a diameter of between 4 mm and 8 mm. The advantage of the pellets having a diameter in this range is that the pellets are easier to cool and handle.

In a further embodiment of the invention, the processes further comprises;

preheating the pellets in a barrel of an injection molder to a temperature of between about 60° C. and about 100° C.; and molding the pellets in a mold of the injection molder having a temperature of between about 115° C. and about 160° C. for between 30 to 80 seconds to form the pet food.

The advantage of injection molding is that a 3-dimensional shape can be achieved. A further advantage is that the density of the pet food can be increased. The advantage of carrying out injection molding at an initial temperature of between about 60° C. to about 100° C. followed by a temperature of between about 115° C. to about 160° C. is that the protein in the wheat gluten only denatures in the last stage of injection molding. Although protein denaturation can occur at temperatures of about 100° C., the pellets are not kept in the barrel for long enough for denaturation to occur. As the liquefied pellets are in the mold at this stage, the protein in the outer skin of the pet food denatures to form a smooth outer skin. The advantage of this is that the pet food retains its shape, has an attractive appearance and is more effective for the animal to chew. Additionally, if the protein only denatures in the outer skin of the pet food, the interior of the pet food has a higher feed value than other products and is therefore more nutritious for the animal.

In another embodiment of the invention the step of extruding the wheat gluten plasticizer composition comprises;

transferring the composition to an elongated die plate in the extruder having a temperature of between about 115° C. and about 160° C.; and retaining the composition in the elongated die plate for at least 5 seconds to form an elongated article.

In a still further embodiment of the invention the process further comprises;

transferring the pellets to an elongated die plate in an extruder having a temperature of between about 115° C. and about 160° C.; and retaining the pellets in the elongated die plate for at least about 5 seconds to form an elongated article.

The advantage of preparing an elongated article by extrusion is that this is a faster and cheaper process than injection molding. Although injection molding is preferable to produce articles with more complex 3-dimensional shapes and with better finishes, extrusion is the preferable option for less complex shapes.

BRIEF DESCRIPTION OF THE DRAWINGS

The present invention is described with reference to the accompanying drawings.

DETAILED DESCRIPTION OF THE INVENTION

Figure 1:
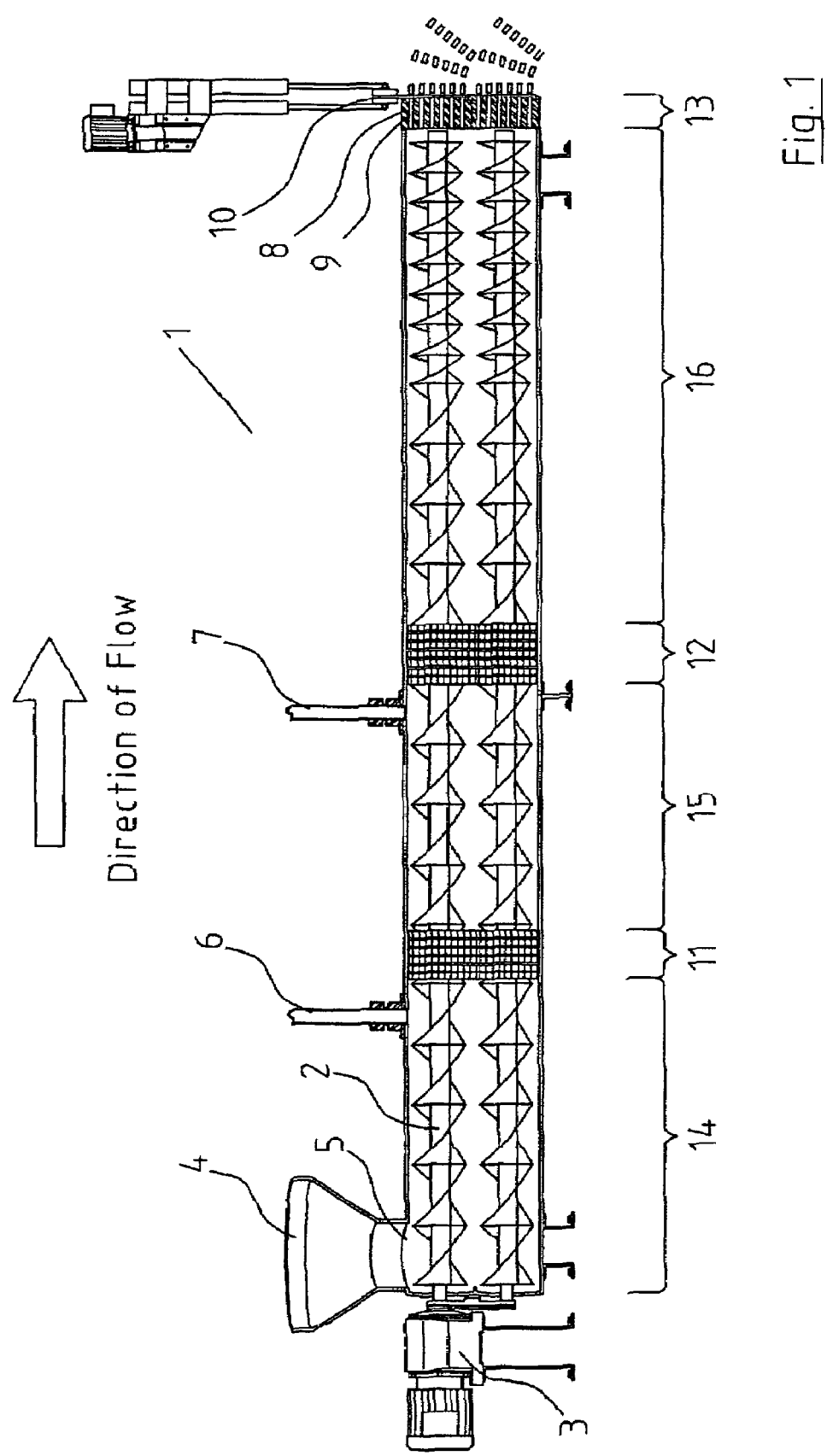
FIG. 1 is an outline drawing showing an extruder according to one embodiment of the invention.
Figure 2:
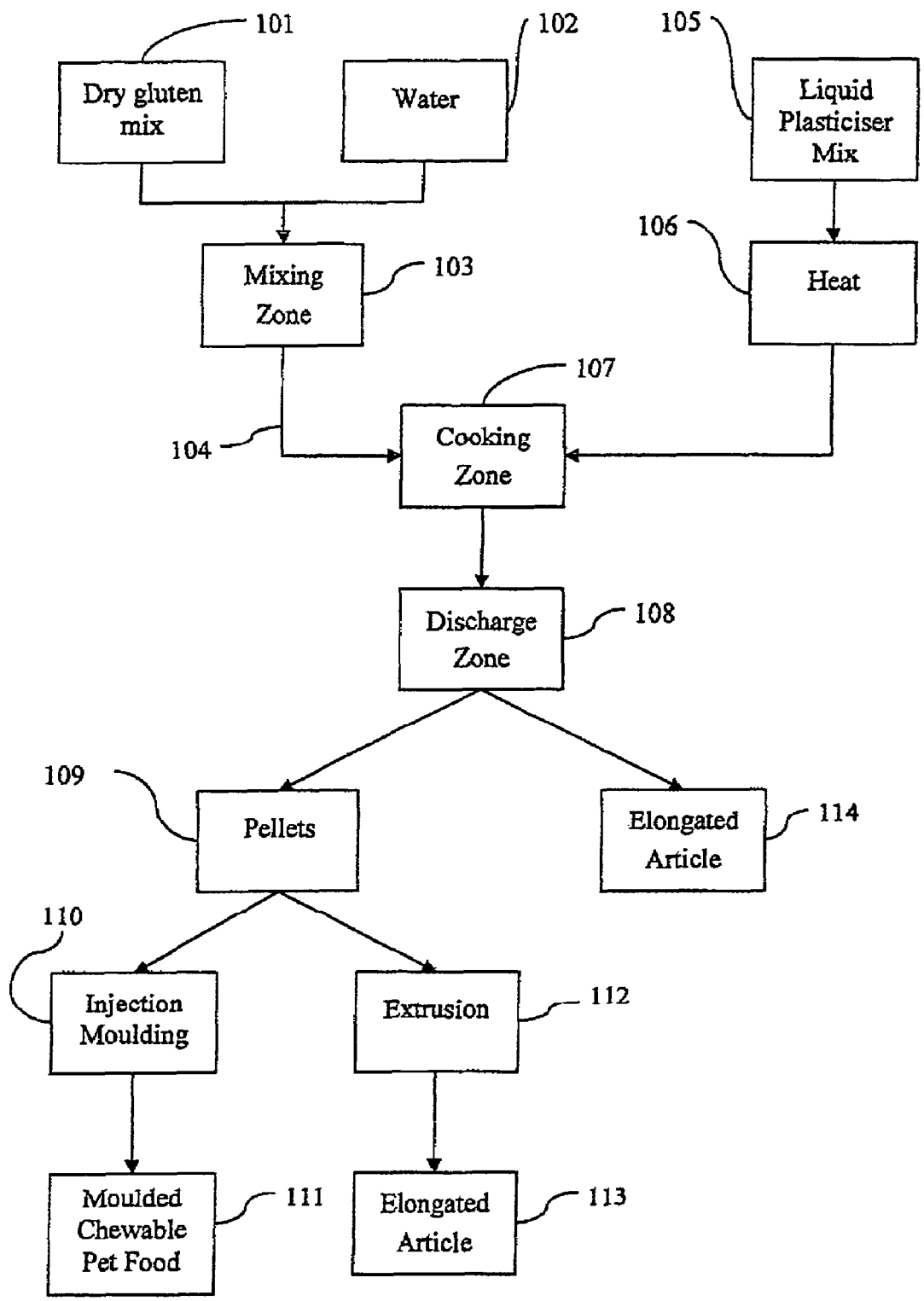
FIG. 2 is a flow diagram of a process according to the invention.

The various embodiments of the present invention and their advantages are best understood by referring to FIGS. 1 and 2 of the drawings. Where applicable, elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

Referring to FIG. 1 there is provided an extruder indicated generally by reference numeral 1 having twin screws 2 and driven by a motor 3. The extruder 1 further comprises an inlet hopper 4 at the extruder inlet 5 and a pair of liquid inlet pipes 6, 7, further downstream. The extruder 1 additionally comprises a conventional pelleting die plate 8, with bores 9 and an associated knife 10.

Essentially the extruder 1 is divided into a mixing zone 11, a cooking zone 12 and a discharge zone 13, interconnected between transfer zones 14, 15, 16 respectively. The mixing and cooking zones 11, 12 comprise paddles for mixing. The paddles in the mixing zone 11 are 30° offset which allows for gentle mixing, and can be either 30°, 60° or 90° offset in the cooking zone 12. A paddle position of 60° or 90° offset would allow more vigorous mixing. Conventional heating means are incorporated within the body of the extruder.

In use the temperature in the extruder 1 increases gradually along the extruder length. Typically, the temperature in the first transfer zone 14, and in the mixing zone 11 is between about 25° C. and about 45° C. The temperature in the second transfer zone 15 is generally between about 40° C. and about 60° C. In the cooking zone 12 and the third transfer zone 16, the temperature is generally between about 45° C. and about 65° C. and the temperature is between about 50° C. and about 70° C. in the discharge zone 13.

Referring to FIG. 2, there is provided a flow diagram of a process according to the invention. In step 101 a dry wheat gluten mix is prepared and is fed into the extruder 1 through the hopper 4 at the extruder inlet 5, and is transferred along the first transfer zone 14. In step 102 water is fed through the liquid inlet pipe 6. The water is mixed with the dry wheat gluten mix in the mixing zone 11 in step 103 to form a moist wheat gluten mix. In step 104 the moist wheat gluten mix is transferred along the second transfer zone 15 to the cooking zone 12. Liquid plasticizer mix is obtained in step 105 and is heated to a temperature of between about 40° C. to about 70° C. In step 106 the heated liquid plasticizer mix is fed through the liquid inlet pipe 7. The liquid plasticizer mix is mixed with the moist wheat gluten mix in the cooking zone 12 in step 107, to form a gluten plasticizer composition. The liquid plasticizer mix feed rate can be varied to control the extruder torque. In step 108 the gluten plasticizer composition is transferred along the third transfer zone 16 to the discharge zone 13. In the discharge zone 13, the composition can be extruded through a die plate 8 comprising bores 9 and cut by an associated knife 10 into pellets in step 109.

In one embodiment of the invention the pellets are transferred to an injection molder in step 110 to form a molded chewable pet food in step 111. The injection molding process is generally a two stage process. The pellets are fed into the barrel of the injection molding machine via an agitated hopper or other suitable method. The temperature of the barrel is kept of between about 60° C. to about 100° C. The residence time of the pellets in the barrel should be kept to less than five minutes and preferably of one minute. The pellets are then fed into the mold where they are heated to between 115° C. to 160° C. and are retained at these temperatures for between 30 to 80 seconds. At this temperature, the protein in the outer section of the pet food denatures to impart a smooth outer layer to the pet food. Optionally the mold cavity of the injection molding machine is coated with a suitable food grade release coating. The resultant pet food when removed from the mold will retain its shape and harden over time to give an elastic flexible feel which is difficult to break during chewing.

It will be appreciated that the injection molding process is a time-temperature dependent process, therefore the higher the temperature used the less time is required and vice-versa.

Alternatively in another embodiment of the invention in step 112 the pellets are transferred to a second extruder with an elongated die plate comprising heating means providing a temperature of between 115° C. and 160° C. An elongated article is formed in the extruder in step 113.

It will be appreciated that the pellets can be optionally cooled and stored to await further processing. If the pellets are stored, they should be bagged to prevent moisture loss.

In a further embodiment of the invention the die plate 8 comprising bores 9 used in step 109 is replaced with an elongated die plate comprising heating means providing a temperature of between 115° C. and 160° C. for forming an elongated article in step 114.

In order to form the elongated article of either step 113 or 114, the composition should be retained in the elongated die plate for at least 5 seconds. It will be appreciated that the shape of the elongated die plate will be chosen to have a specific cross-sectional shape which will impart the same cross-sectional shape to the elongated article.

EXAMPLE 1

The composition and chewable pet food were prepared as follows and according to the quantities as outlined in Table 1.

A dry mix was prepared by mixing the wheat gluten, cellulose fibre, chicken digest, and calcium stearate together. The dry mix was fed into an extruder having an inlet temperature of 40° C. and fed along a transfer zone. Water was then mixed with the dry wheat gluten mix in the mixing zone to provide the moist wheat gluten mix. The paddles in the mixing zone were set at 30° offset. The moist wheat gluten mix was transferred along the second transfer zone of the extruder which had a temperature of 50° C. A liquid plasticizer mix was prepared by mixing together the glycerine, peppermint oil and colorings. The liquid plasticizer mix was then heated to a temperature of 55° C. before feeding it into the extruder where it was mixed with the moist wheat gluten mix in the cooking zone to form the gluten plasticizer composition. The paddles in the cooking zone were set at 60° offset. The temperature in the cooking zone was 55° C. The gluten plasticizer composition was transferred along the third transfer zone having a temperature of 60° C. to a discharge zone where the composition was extruded through a die plate and cut into pellets. The pellets were cooled and transferred to a barrel of an injection molding machine having a temperature of 90° C. where the pellets were retained for one minute. The pellets were then transferred to the mold of the injection molding machine which was at a temperature of 125° C. and were retained in the mold for 70 seconds. The pet food was then removed from the mold and allowed to harden.

TABLE 1

Composition of Extendable Product

| Ingredient | Amount % |
| --- | --- |
| Wheat gluten | 60 |
| Glycerine | 20 |
| Cellulose fibre | 5 |
| Chicken digest | 2.5 |
| Calcium stearate | 0.5 |
| Peppermint oil | 0.04 |
| Colourings | 0.05 |
| Water | 11.91 |
| Total | 100% |

A high percentage of glycerine was included in this composition and the resultant pet food was found to be very pliable and flexible.

EXAMPLE 2

The composition and chewable pet food were prepared as follows and according to the quantities as outlined in Table 2.

A dry mix was prepared by mixing the wheat gluten, cellulose fibre, chicken digest, monoglycerides of edible fatty acids, sodium tripolyphosphate, calcium stearate and potassium chloride together. The dry mix was fed into an extruder having an inlet temperature of 45° C. and fed along a transfer zone. Water was then mixed with the dry wheat gluten mix in the mixing zone to provide the moist wheat gluten mix. The paddles in the mixing zone were set at 30° offset. The moist wheat gluten mix was transferred along the second transfer zone of the extruder which had a temperature of 55° C. A liquid plasticizer mix was prepared by mixing together the glycerine, parsley oil and colorings. The liquid plasticizer mix was then heated to a temperature of 55° C. before feeding it into the extruder where it was mixed with the moist wheat gluten mix in the cooking zone to form the gluten plasticizer composition. The paddles in the cooling zone were set at 60° offset. The temperature in the cooking zone was 60° C. The gluten plasticizer composition was transferred along the third transfer zone having a temperature of 65° C. to the discharge zone with an elongated die plate, having a temperature of 140° C. The composition was retained in the elongated die plate for 5 seconds until an elongated article having the cross-sectional shape of the die plate was formed. The article was cut to the desired size using the automatic knife and allowed to harden.

TABLE 2

Composition of Extrudable Product

| Ingredient | Amount % |
| --- | --- |
| Wheat gluten | 60 |
| Glycerine | 15 |
| Cellulose fibre | 5 |
| Chicken digest | 3 |
| Monoglycerides of edible fatty acids | 0.5 |
| Sodium tripolyphosphate | 0.5 |
| Calcium stearate | 0.5 |
| Potassium chloride | 0.02 |
| Parsley oil | 0.02 |
| Colourings | 0.02 |
| Water | 15.44 |
| Total | 100% |

EXAMPLE 3

The composition and chewable pet food were prepared as follows and according to the quantities as outlined in Table 3.

A dry mix was prepared by mixing the wheat gluten, sodium tripolyphosphate and potassium chloride. The dry mix was fed into an extruder having an inlet temperature of 35° C. and fed along the transfer zone. Water was then mixed with the dry wheat gluten mix in the mixing zone to provide the moist wheat gluten mix. The paddles in the mixing zone were set at 30° offset. The moist wheat gluten mix was transferred along the second transfer zone of the extruder which had a temperature of 45° C. A liquid plasticizer mix was prepared by mixing together the glycerine, parsley oil and colorings. The liquid plasticizer mix was then heated to a temperature of 50° C. before feeding it into the extruder where it was mixed with the moist wheat gluten mix in the cooking zone to form the gluten plasticizer composition. The paddles in the cooking zone were set at 60° offset. The temperature in the cooking zone was 50° C. The gluten plasticizer composition was transferred along the third transfer zone having a temperature of 55° C. to a discharge zone where the composition was extruded through a die plate and cut into pellets. The pellets were cooled and transferred to a second extruder with an elongated die plate having a temperature of 130° C. The pellets were retained in the elongated die plate for 5 seconds until an elongated article having the cross-sectional shape of the die plate was formed. The article was cut to the desired size using the automatic knife and allowed to harden

TABLE 3

Composition of Extrudable Product

| Ingredient | Amount % |
| --- | --- |
| Wheat gluten | 70 |
| Glycerine | 15 |
| Sodium tripolyphosphate | 1 |
| Potassium chloride | 0.1 |
| Parsley oil | 0.03 |
| Colourings | 0.03 |
| Water | 13.84 |
| Total | 100% |

EXAMPLE 4

The composition and chewable pet food were prepared as follows and according to the quantities as outlined in Table 4.

A dry mix was prepared by mixing the wheat gluten, chicken digest and monoglycerides of edible fatty acids together. The dry mix was fed into an extruder having an inlet temperature of 30° C. and fed along a transfer zone. Water was then mixed with the dry wheat gluten mix in the mixing zone to provide a moist wheat gluten mix. The paddles in the mixing zone were set at 30° offset. The moist wheat gluten mix was then transferred along the second transfer zone of the extruder which had a temperature of 50° C. A liquid plasticizer mix was prepared by mixing together the glycerine, peppermint oil and colorings. The liquid plasticizer mix was then heated to a temperature of 55° C. before feeding it into the extruder where it was mixed with the moist wheat gluten mix in the cooking zone to form a gluten plasticizer composition. The paddles in the cooking zone were set at 60° offset. The temperature in the cooking zone was 55° C. The gluten plasticizer composition was transferred along the third transfer zone having a temperature of 60° C. to the discharge zone where the composition was extruded through a die plate and cut into pellets. The pellets were cooled and transferred to a barrel of an injection molding machine having a temperature of 95° C. where the pellets were retained for one minute. The pellets were then transferred to the mold of an injection molding machine which was at a temperature of 155° C. and retained in the mold for 30 seconds. The pet food was then removed from the mold and allowed to harden.

TABLE 4

Composition of Extrudable Product

| Ingredient | Amount % |
| --- | --- |
| Wheat gluten | 65 |
| Glycerine | 17 |
| Chicken digest | 3 |
| Monoglycerides of edible fatty acids | 0.5 |
| Peppermint oil | 0.02 |
| Colourings | 0.03 |
| Water | 14.45 |
| Total | 100% |

EXAMPLE 5

The composition and chewable pet food were prepared as follows and according to the quantities as outlined in Table 5.

A dry mix was prepared by mixing the wheat gluten, cellulose fibre, sodium tripolyphosphate, calcium stearate and potassium chloride together. The dry mix was fed into an extruder having an inlet temperature of 30° C. and fed through a transfer zone. Water was then mixed with the dry wheat gluten mix in the mixing zone to provide the moist wheat gluten mix. The paddles in the mixing zone were set at 30° offset. The moist wheat gluten mix was transferred along the second transfer zone of the extruder which had a temperature of 55° C. A liquid plasticizer mix was prepared by mixing together the glycerine and peppermint oil. The liquid plasticizer mix was then heated to a temperature of 60° C. before feeding it into the extruder where it was mixed with the moist wheat gluten mix in the cooking zone to form the gluten plasticizer composition. The paddles in the cooking zone were set at 90° offset. The temperature in the cooking zone was 60° C. The wheat gluten plasticizer composition was transferred along the third transfer zone having a temperature of 65° C. to a discharge zone where the composition was extruded through a die plate and cut into pellets. The pellets were cooled and transferred to the barrel of an injection molding machine having a temperature of 90° C. where the pellets were retained for one minute. The pellets were then transferred to the mold of the injection molding machine which was at a temperature of 150° C. and were retained in the mold for 45 seconds. The pet food was then removed from the mold and allowed to harden.

TABLE 5

Composition of Extrudable Product

| Ingredient | Amount % |
| --- | --- |
| Wheat gluten | 65 |
| Glycerine | 10 |
| Cellulose fibre | 7.5 |
| Sodium tripolyphosphate | 0.75 |
| Calcium stearate | 0.5 |
| Potassium chloride | 0.05 |
| Peppermint oil | 0.05 |
| Water | 16.15 |
| Total | 100% |

Table 6 below gives the chemical analysis of a typical extrudable product, prepared by the process of the invention. It will be appreciated that a high source of protein in the product would be the wheat gluten or chicken digest and variations in these components will have an effect on the protein content. Similarly, the fat content is related to the amount of chicken digest added. The wheat gluten and additional fibre are the main sources of fibre in the product.

TABLE 6

Analysis of Extrudable Product

| Component | Value (%) | Target Range (%) |
| --- | --- | --- |
| Protein | 52 | 45-70 |
| Fat | 4 | 0-8 |
| Fibre | 6 | 2-10 |
| Moisture | 15 | 8-18 |

In the specification the terms "comprise, comprises, comprised and comprising" or any variation thereof and the terms "include, includes, included and including" or any variation thereof are considered to be totally interchangeable and they should all be afforded the widest possible interpretation.

As described above and shown in the associated drawings, the present invention comprises an apparatus for a process for preparing a chewable pet food. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

We claim:

1. A process for preparing an extrudable product, suitable for forming into a chewable pet food, the product comprising between 56% to 80% dry wheat gluten mix, between 9% to about 28% liquid plasticizer mix and between 8% to 18% moisture by weight of the product, comprising the steps of:
   a. feeding the dry wheat gluten mix into an extruder having an inlet temperature in the region of between 25° C. and 45° C. and an exit temperature in the region of between 50° C. and 70° C. and mixing the dry wheat gluten mix with water in the extruder to form a moist wheat gluten mix;
   b. heating the liquid plasticizer mix to a temperature in the range of between 40° C. and 70° C.;
   c. feeding the liquid plasticizer mix into the extruder and mixing with the moist wheat gluten mix in the extruder to form a gluten plasticizer composition; and
   d. extruding the gluten plasticizer composition to form the extrudable product.

2. The process of claim 1, wherein the extruder has an inlet temperature of about 35° C.

3. The process of claim 1, wherein the extruder has an exit temperature of about 60° C.

4. The process of claim 3, wherein the extruder has an inlet temperature of about 35° C.

5. The process of claim 1, wherein the extruder is run at between 60% and 70% of the operating speed of the extruder.

6. The process of claim 5, wherein the extruder has an inlet temperature of about 35° C.

7. The process of claim 6, wherein the extruder has an exit temperature of about 60° C.

8. The process of claim 1, wherein the dry wheat gluten mix comprises at least 70% wheat gluten by weight of the mix.

9. The process of claim 8, wherein the extruder is run at between 60% and 70% of the operating speed of the extruder.

10. The process of claim 9, wherein the extruder has an inlet temperature of about 35° C.

11. The process of claim 10, wherein the extruder has an exit temperature of about 60° C.

12. The process of claim 1, wherein the dry wheat gluten mix further comprises a fibre selected from the group consisting of one or more of cellulose fibre, wheat fibre and wheat bran in the range of between 0.1 and 18.0% by weight of the mix.

13. The process of claim 12, wherein the dry wheat gluten mix comprises at least 70% wheat gluten by weight of the mix.

14. The process of claim 13, wherein the extruder is run at between 60% and 70% of the operating speed of the extruder.

15. The process of claim 14, wherein the extruder has an inlet temperature of about 35° C.

16. The process of claim 15, wherein the extruder has an exit temperature of about 60° C.

17. The process of claim 1, wherein the dry wheat gluten mix further comprises chicken digest in the range of between 0.1 and 10.8% by weight of the mix.

18. The process of claim 17, wherein the dry wheat gluten mix further comprises a fibre selected from the group consisting of one or more of cellulose fibre, wheat fibre and wheat bran in the range of between 0.1 and 18.0% by weight of the mix.

19. The process of claim 18, wherein the dry wheat gluten mix comprises at least 70% wheat gluten by weight of the mix.

20. The process of claim 19, wherein the extruder is run at between 60% and 70% of the operating speed of the extruder.

21. The process of claim 20, wherein the extruder has an inlet temperature of about 35° C.

22. The process of claim 21, wherein the extruder has an exit temperature of about 60° C.

23. The process of claim 1, wherein the dry wheat gluten mix further comprises monoglycerides of edible fatty acids of between 0.1 and 1.8% by weight of the mix.

24. The process of claim 23, wherein the dry wheat gluten mix further comprises chicken digest in the range of between 0.1 and 10.8% by weight of the mix.

25. The process of claim 24, wherein the dry wheat gluten mix further comprises a fibre selected from the group consisting of one or more of cellulose fibre, wheat fibre and wheat bran in the range of between 0.1 and 18.0% by weight of the mix.

26. The process of claim 25, wherein the dry wheat gluten mix comprises at least 70% wheat gluten by weight of the mix.

27. The process of claim 26, wherein the extruder is run at between 60% and 70% of the operating speed of the extruder.

28. The process of claim 27, wherein the extruder has an inlet temperature of about 35° C.

29. The process of claim 28, wherein the extruder has an exit temperature of about 60° C.

30. The process of claim 1, wherein the dry wheat gluten mix further comprises a phosphate selected from the group consisting of one or more of sodium tripolyphosphate, calcium tripolyphosphate, calcium hydrogen phosphate and tetrasodium pyrophosphate in the range of between 0.1 and 1.8% by weight of the mix.

31. The process of claim 30, wherein the dry wheat gluten mix further comprises monoglycerides of edible fatty acids in the range of between 0.1 and 1.8% by weight of the mix.

32. The process of claim 31, wherein the dry wheat gluten mix further comprises chicken digest in the range of between 0.1 and 10.8% by weight of the mix.

33. The process of claim 32, wherein the dry wheat gluten mix further comprises a fibre selected from the group consisting of one or more of cellulose fibre, wheat fibre and wheat bran in the range of between 0.1 and 18.0% by weight of the mix.

34. The process of claim 33, wherein the dry wheat gluten mix comprises at least 70% wheat gluten by weight of the mix.

35. The process of claim 34, wherein the extruder is run at between 60% and 70% of the operating speed of the extruder.

36. The process of claim 35, wherein the extruder has an inlet temperature of about 35° C.

37. The process of claim 36, wherein the extruder has an exit temperature of about 60° C.

38. The process of claim 1, wherein the dry wheat gluten mix further comprises a stearate selected from the group consisting of one or more of calcium stearate and magnesium stearate in the range of between 0.1 and 1.8% by weight of the mix.

39. The process of claim 1, wherein the dry wheat gluten mix further comprises a phosphate selected from the group consisting of one or more of sodium tripolyphosphate, calcium tripolyphosphate, calcium hydrogen phosphate and tetrasodium pyrophosphate in the range of between 0.1 and 1.8% by weight of the mix.

40. The process of claim 39, wherein the dry wheat gluten mix further comprises monoglycerides of edible fatty acids in the range of between 0.1 and 1.8% by weight of the mix.

41. The process of claim 40, wherein the dry wheat gluten mix further comprises chicken digest in the range of between 0.1 and 10.8% by weight of the mix.

42. The process of claim 41, wherein the dry wheat gluten mix further comprises a fibre selected from the group consisting of one or more of cellulose fibre, wheat fibre and wheat bran in the range of between 0.1 and 18.0% by weight of the mix.

43. The process of claim 42, wherein the dry wheat gluten mix comprises at least 70% wheat gluten by weight of the mix.

44. The process of claim 43, wherein the extruder is run at between 60% and 70% of the operating speed of the extruder.

45. The process of claim 44, wherein the extruder has an inlet temperature of about 35° C.

46. The process of claim 45, wherein the extruder has an exit temperature of about 60° C.

47. The process of claim 1, wherein the dry wheat gluten mix further comprises potassium chloride in the range of between 0.1 and 0.18% by weight of the mix.

48. The process of claim 47, wherein the dry wheat gluten mix further comprises a phosphate selected from the group consisting of one or more of sodium tripolyphosphate, calcium tripolyphosphate, calcium hydrogen phosphate and tetrasodium pyrophosphate in the range of between 0.1 and 1.8% by weight of the mix.

49. The process of claim 48, wherein the dry wheat gluten mix further comprises monoglycerides of edible fatty acids in the range of between 0.1 and 1.8% by weight of the mix.

50. The process of claim 49, wherein the dry wheat gluten mix further comprises chicken digest in the range of between 0.1 and 10.8% by weight of the mix.

51. The process of claim 50, wherein the dry wheat gluten mix further comprises a fibre selected from the group consisting of one or more of cellulose fibre, wheat fibre and wheat bran in the range of between 0.1 and 18.0% by weight of the mix.

52. The process of claim 51, wherein the dry wheat gluten mix comprises at least 70% wheat gluten by weight of the mix.

53. The process of claim 52, wherein the extruder is run at between 60% and 70% of the operating speed of the extruder.

54. The process of claim 53, wherein the extruder has an inlet temperature of about 35° C.

55. The process of claim 54, wherein the extruder has an exit temperature of about 60° C.

56. The process of claim 1, wherein the liquid plasticizer mix comprises at least 95% plasticizer by weight of the liquid plasticizer mix.

57. The process of claim 56, wherein the dry wheat gluten mix further comprises potassium chloride in the range of between 0.1 and 0.18% by weight of the mix.

58. The process of claim 57, wherein the dry wheat gluten mix further comprises a phosphate selected from the group consisting of one or more of sodium tripolyphosphate, calcium tripolyphosphate, calcium hydrogen phosphate and tetrasodium pyrophosphate in the range of between 0.1 and 1.8% by weight of the mix.

59. The process of claim 58, wherein the dry wheat gluten mix further comprises monoglycerides of edible fatty acids in the range of between 0.1 and 1.8% by weight of the mix.

60. The process of claim 59, wherein the dry wheat gluten mix further comprises chicken digest in the range of between 0.1 and 10.8% by weight of the mix.

61. The process of claim 60, wherein the dry wheat gluten mix further comprises a fibre selected from the group consisting of one or more of cellulose fibre, wheat fibre and wheat bran in the range of between 0.1 and 18.0% by weight of the mix.

62. The process of claim 61, wherein the dry wheat gluten mix comprises at least 70% wheat gluten by weight of the mix.

63. The process of claim 62, wherein the extruder is run at between 60% and 70% of the operating speed of the extruder.

64. The process of claim 63, wherein the extruder has an inlet temperature of about 35° C.

65. The process of claim 64, wherein the extruder has an exit temperature of about 60° C.

66. The process of claim 1, wherein the plasticizer is selected from the group consisting of one or more of glycerine, propylene glycol, diglycerol, triethylene glycol, urea, sorbitol, mannitol, maltitol, hydrogenated corn syrup, polyvinyl alcohol, polyethylene glycol, $C_{12}$-$C_{22}$ fatty acids and metal salts of such fatty acids.

67. The process of claim 66 wherein the liquid plasticizer mix comprises at least 95% plasticizer by weight of the liquid plasticizer mix.

68. The process of claim 67, wherein the dry wheat gluten mix further comprises potassium chloride in the range of between 0.1 and 0.18% by weight of the mix.

69. The process of claim 68, wherein the dry wheat gluten mix further comprises a phosphate selected from the group consisting of one or more of sodium tripolyphosphate, calcium tripolyphosphate, calcium hydrogen phosphate and tetrasodium pyrophosphate in the range of between 0.1 and 1.8% by weight of the mix.

70. The process of claim 69, wherein the dry wheat gluten mix further comprises monoglycerides of edible fatty acids in the range of between 0.1 and 1.8% by weight of the mix.

71. The process of claim 70, wherein the dry wheat gluten mix further comprises chicken digest in the range of between 0.1 and 10.8% by weight of the mix.

72. The process of claim 71, wherein the dry wheat gluten mix further comprises a fibre selected from the group consisting of one or more of cellulose fibre, wheat fibre and wheat bran in the range of between 0.1 and 18.0% by weight of the mix.

73. The process of claim 72, wherein the dry wheat gluten mix comprises at least 70% wheat gluten by weight of the mix.

74. The process of claim 73, wherein the extruder is run at between 60% and 70% of the operating speed of the extruder.

75. The process of claim 74, wherein the extruder has an inlet temperature of about 35° C.

76. The process of claim 75, wherein the extruder has an exit temperature of about 60° C.

77. The process of claim 1, wherein the liquid plasticizer mix further comprises a hygiene additive selected from the group consisting of one or more of peppermint oil and parsley oil in the range of between 0.01% and 0.5% by weight of the mix.

78. The process of claim 77, wherein the plasticizer is selected from the group consisting of one or more of glycerine, propylene glycol, diglycerol, triethylene glycol, urea, sorbitol, mannitol, maltitol, hydrogenated corn syrup, polyvinyl alcohol, polyethylene glycol, $C_{12}$-$C_{22}$ fatty acids and metal salts of such fatty acids.

79. The process of claim 78, wherein the liquid plasticizer mix comprises at least 95% plasticizer by weight of the liquid plasticizer mix.

80. The process of claim 79, wherein the dry wheat gluten mix further comprises potassium chloride in the range of between 0.1 and 0.18% by weight of the mix.

81. The process of claim 80, wherein the dry wheat gluten mix further comprises a phosphate selected from the group consisting of one or more of sodium tripolyphosphate, calcium tripolyphosphate, calcium hydrogen phosphate and tetrasodium pyrophosphate in the range of between 0.1 and 1.8% by weight of the mix.

82. The process of claim 81, wherein the dry wheat gluten mix further comprises monoglycerides of edible fatty acids in the range of between 0.1 and 1.8% by weight of the mix.

83. The process of claim 82, wherein the dry wheat gluten mix further comprises chicken digest in the range of between 0.1 and 10.8% by weight of the mix.

84. The process of claim 83, wherein the dry wheat gluten mix further comprises a fibre selected from the group consisting of one or more of cellulose fibre, wheat fibre and wheat bran in the range of between 0.1 and 18.0% by weight of the mix.

85. The process of claim 84, wherein the dry wheat gluten mix comprises at least 70% wheat gluten by weight of the mix.

86. The process of claim 85, wherein the extruder is run at between 60% and 70% of the operating speed of the extruder.

87. The process of claim 86, wherein the extruder has an inlet temperature of about 35° C.

88. The process of claim 87, wherein the extruder has an exit temperature of about 60° C.

89. The process of claim 1, wherein the liquid plasticizer mix further comprises colourings in the range of between 0.01% and 0.5% by weight of the mix.

90. The process of claim 89, wherein the liquid plasticizer mix further comprises a hygiene additive selected from the group consisting of one or more of peppermint oil and parsley oil in the range of between 0.01% and 0.5% by weight of the mix.

91. The process of claim 90, wherein the plasticizer is selected from the group consisting of one or more of glycerine, propylene glycol, diglycerol, triethylene glycol, urea, sorbitol, mannitol, maltitol, hydrogenated corn syrup, polyvinyl alcohol, polyethylene glycol, $C_{12}$-$C_{22}$ fatty acids and metal salts of such fatty acids.

92. The process of claim 91, wherein the liquid plasticizer mix comprises at least 95% plasticizer by weight of the liquid plasticizer mix.

93. The process of claim 92, wherein the dry wheat gluten mix further comprises potassium chloride in the range of between 0.1 and 0.18% by weight of the mix.

94. The process of claim 93, wherein the dry wheat gluten mix further comprises a phosphate selected from the group consisting of one or more of sodium tripolyphosphate, calcium tripolyphosphate, calcium hydrogen phosphate and tetrasodium pyrophosphate in the range of between 0.1 and 1.8% by weight of the mix.

95. The process of claim 94, wherein the dry wheat gluten mix further comprises monoglycerides of edible fatty acids in the range of between 0.1 and 1.8% by weight of the mix.

96. The process of claim 95, wherein the dry wheat gluten mix further comprises chicken digest in the range of between 0.1 and 10.8% by weight of the mix.

97. The process of claim 96, wherein the dry wheat gluten mix further comprises a fibre selected from the group consisting of one or more of cellulose fibre, wheat fibre and wheat bran in the range of between 0.1 and 18.0% by weight of the mix.

98. The process of claim 97, wherein the dry wheat gluten mix comprises at least 70% wheat gluten by weight of the mix.

99. The process of claim 98, wherein the extruder is run at between 60% and 70% of the operating speed of the extruder.

100. The process of claim 99, wherein the extruder has an inlet temperature of about 35° C.

101. The process of claim 100, wherein the extruder has an exit temperature of about 60° C.

102. The process of claim 1, wherein said step of extruding comprises extruding the gluten plasticizer composition to form a plurality of pellets.

103. The process of claim 102, wherein each of said plurality pellets is substantially cylindrical having a diameter of between about 4 mm to about 8 mm.

104. The process of claim 103, wherein said process further comprises the steps of:
   a. preheating the pellets in a barrel of an injecting molder to a temperature of between about 60° C. to about 100° C.; and
   b. molding the pellets in a mold of the injection molder having a temperature of between about 115° C. to about 160° C. for between about 30 to about 80 seconds to form the chewable pet food.

105. The process of claim 104, wherein said process further comprises the steps of:
   a. transferring the pellets to an elongated die plate in an extruder having a temperature of between about 115° C. to about 160° C.; and
   b. retaining the pellets in the elongated die plate for at least 5 seconds to form an elongated article.

* * * * *